United States Patent [19]

Nelson

[11] 4,114,947
[45] Sep. 19, 1978

[54] DETACHABLE SEAT MOUNTING FOR BUSES

[75] Inventor: Eldrid W. Nelson, Minneapolis, Minn.

[73] Assignees: Chas. Olson & Sons; Wheel Service Co., Inc., both of St. Paul, Minn.

[21] Appl. No.: 852,924

[22] Filed: Nov. 18, 1977

[51] Int. Cl.² ............................................. A47C 1/02
[52] U.S. Cl. .................................. 297/344; 248/503.1
[58] Field of Search ....................... 297/344, 385, 216; 248/503.1, 424, 429, 503, 501; 105/482; 296/65 R

[56] References Cited

U.S. PATENT DOCUMENTS

| 2,605,064 | 7/1952 | Davis ................................ 248/501 X |
| 2,743,684 | 5/1956 | Elsner ............................... 105/482 X |
| 3,204,916 | 9/1965 | Pickles ................................... 248/429 |
| 3,392,954 | 7/1968 | Malette ............................. 248/501 X |
| 3,486,204 | 12/1969 | Hurtner et al. .................. 248/501 X |
| 3,603,638 | 9/1971 | McGregor et al. ............. 248/409 X |
| 3,620,171 | 11/1971 | Brenia et al. ........................ 105/482 |
| 3,652,050 | 3/1972 | Marrujo et al. ................. 297/344 X |
| 4,047,689 | 9/1977 | Grendahl .......................... 248/503.1 |
| 4,060,271 | 11/1977 | Williams ............................ 296/65 R |

FOREIGN PATENT DOCUMENTS

| 1,094,483 | 12/1954 | France ..................................... 297/344 |
| 1,326,558 | 4/1963 | France ..................................... 297/344 |

Primary Examiner—James T. McCall
Attorney, Agent, or Firm—H. Dale Palmatier

[57] ABSTRACT

A detachable mounting for a seating device in a passenger type motor bus wherein an anchoring track is mounted on the floor and the base of the seating device has feet with heads which extend into the guideway of the track and are retained against upward movement by flanges in the track, and a locking pin also on the base urged downwardly into the guideway of the track and against the bottom of the track to pull the heads of the feet upwardly against the flanges and securely anchor the seating device against any movement relative to the floor of the bus.

10 Claims, 17 Drawing Figures

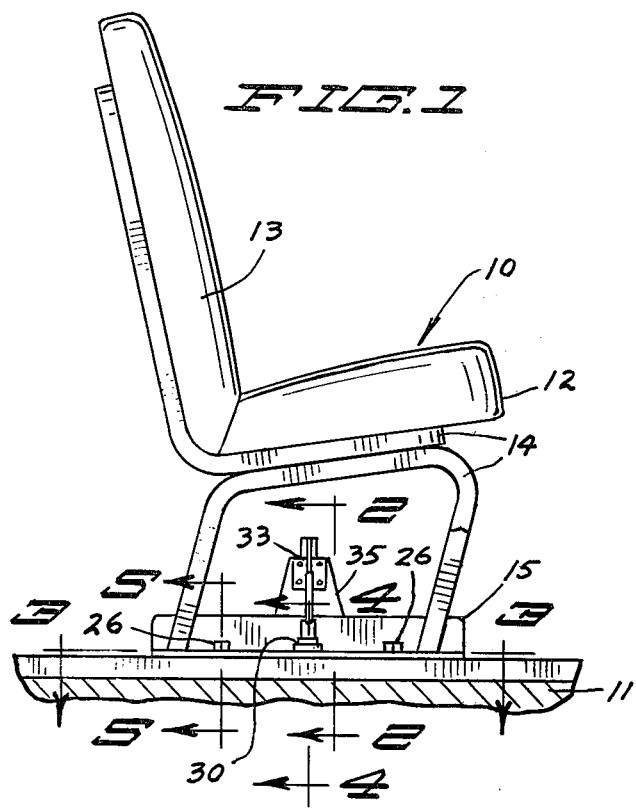
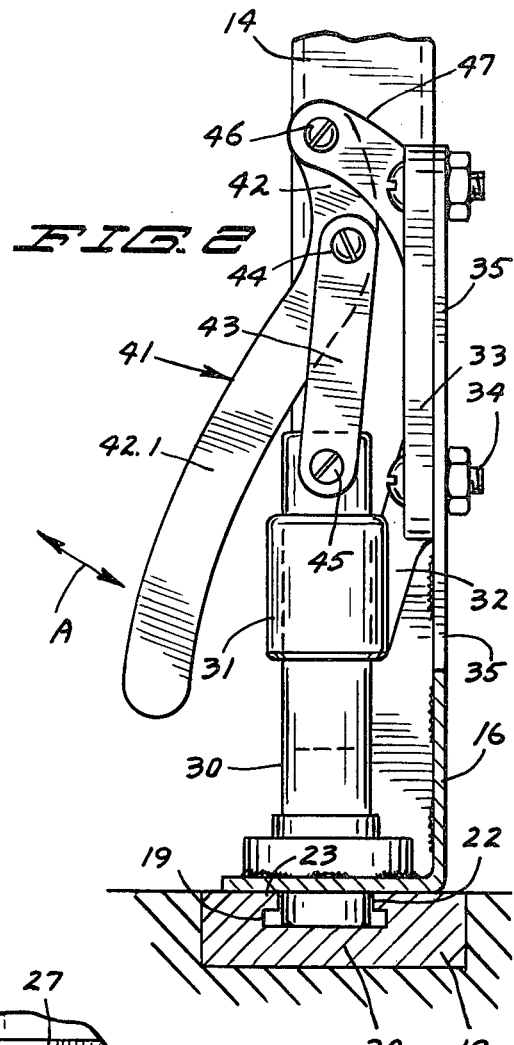
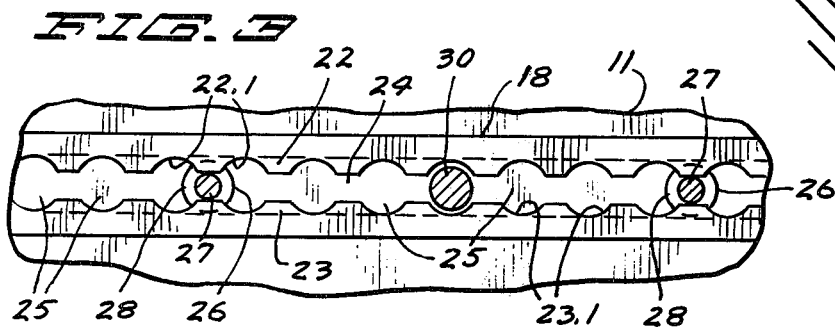
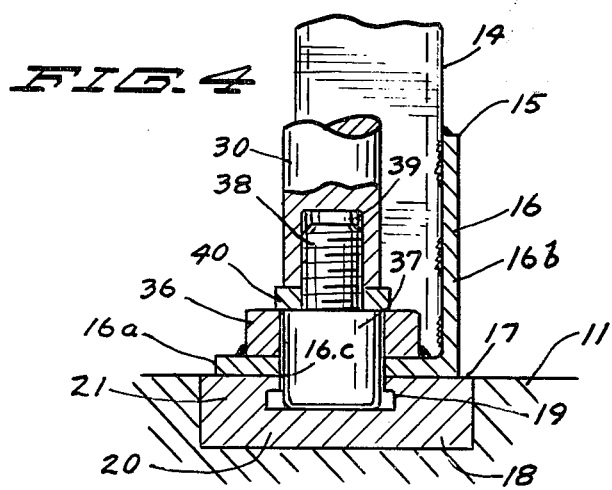
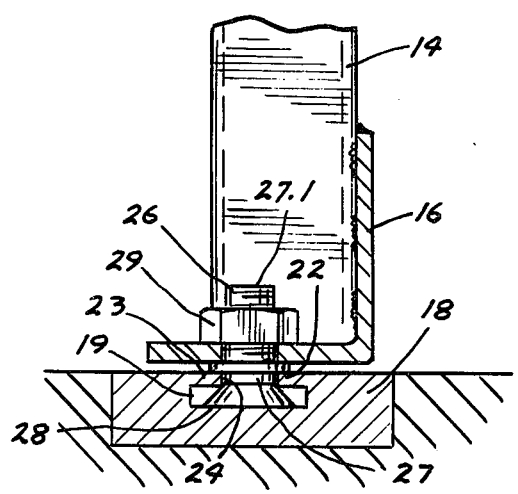

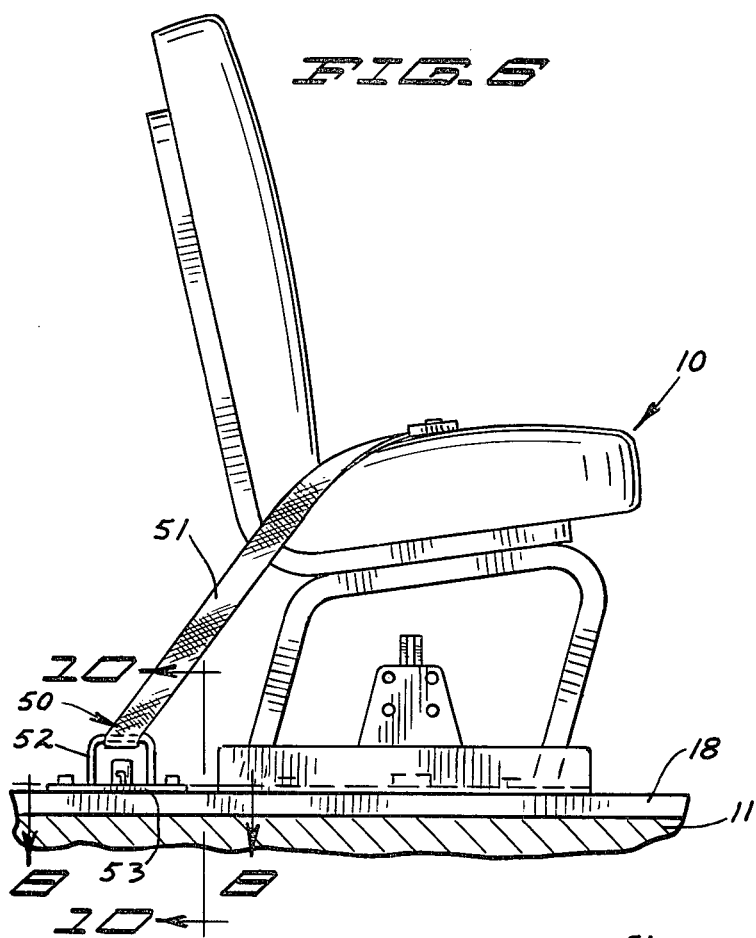
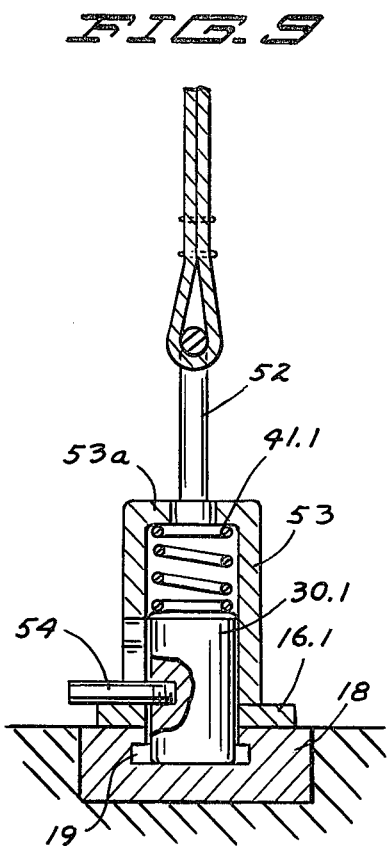
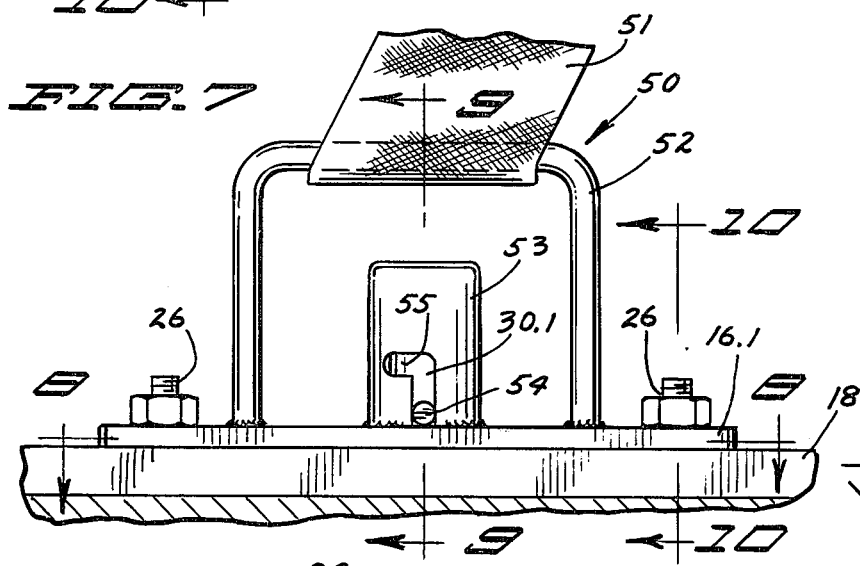
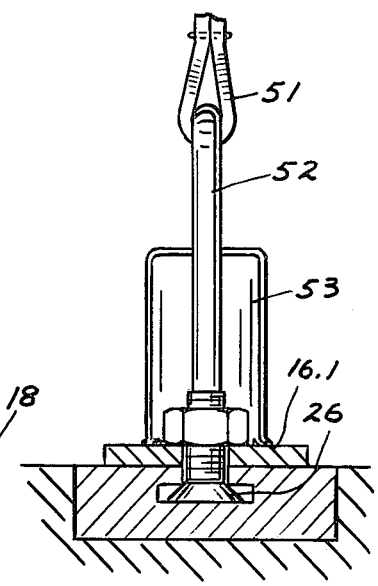
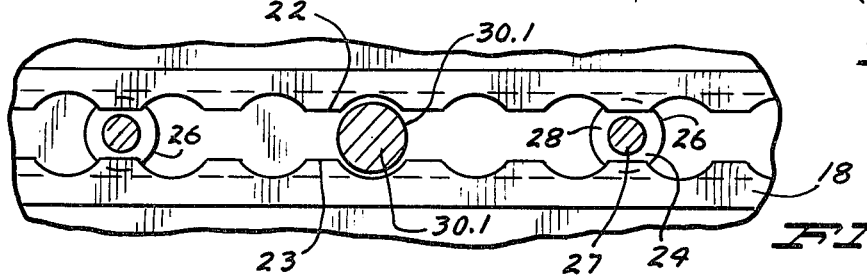

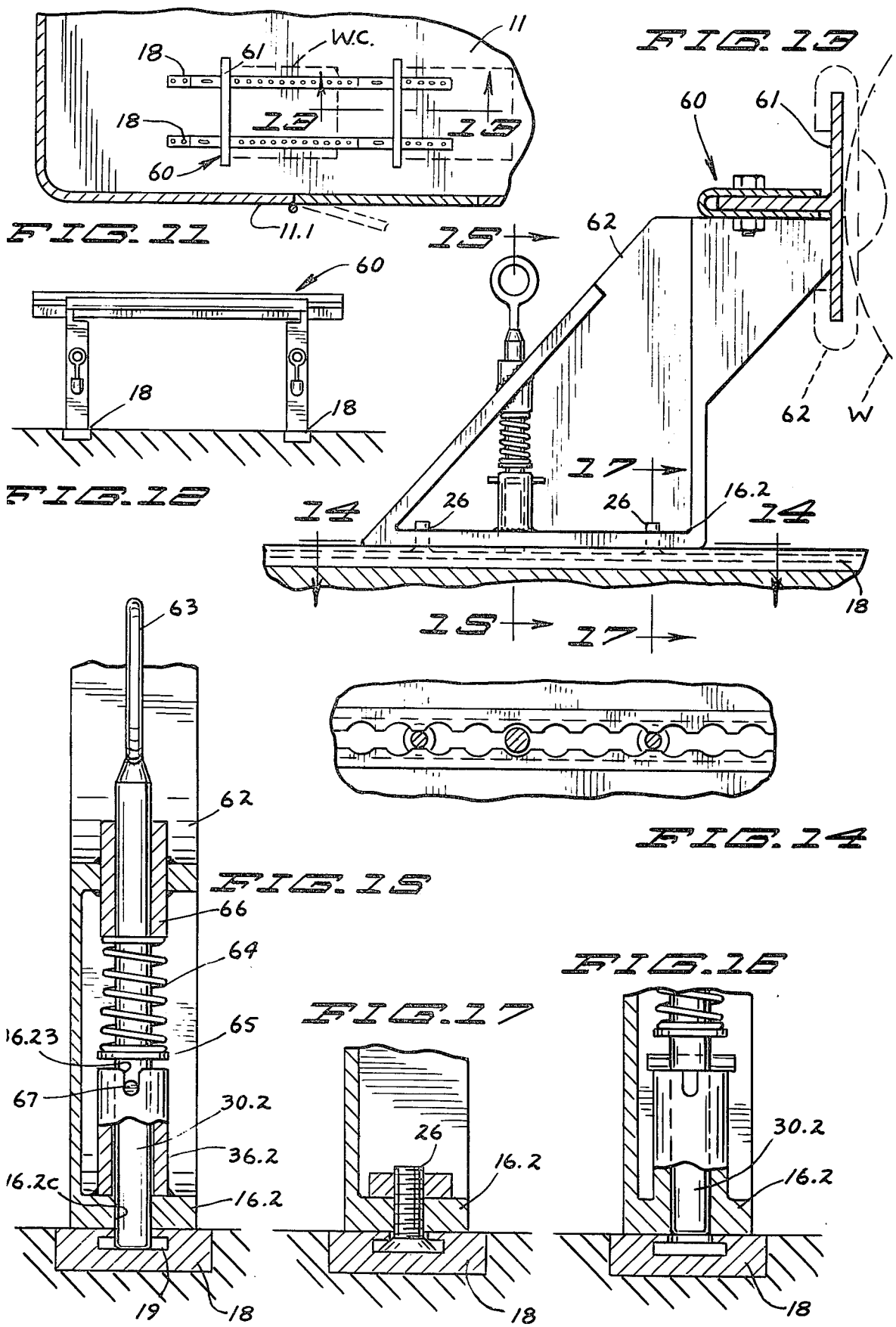

DETACHABLE SEAT MOUNTING FOR BUSES

This invention relates to a detachable mounting for seats and seat-related fixtures in a passenger carrying bus such as a school bus.

BACKGROUND OF THE INVENTION

In almost all of the passenger type buses, exemplified by school buses, the seats are fixedly attached so as to be almost entirely immovable to the floor of the bus body with the result that once the seats are installed, they will stay in that one position until the bus body is entirely worn out.

In a few large vehicles for carrying a large number of passengers, the seats are arranged so that they can be detached from the floor of the body and either rearranged or entirely removed. Difficulties have been encountered with such seats, especially those which are fairly easily removable, because the seats, when installed, are simply not held firmly to the vehicle body but constantly wiggle and move around so as to be a source of noise and irritation to the passengers. Of course, such seats which are not tightly anchored can be dangerous because they may very well inadvertently release from their mountings so that, in the event of a sudden change of speed or direction, the seats may act like a missile to the injury of certain passengers.

SUMMARY OF THE INVENTION

The present invention relates to a detachable mounting by which seats, and other seat-related fixtures may be attached to the body of a bus-type vehicle. Not only will the mounting apparatus permit the seat or other fixtures to be readily applied and removed from the vehicle body, the seat or other fixture which is retained by the mounting will be held very firmly to the vehicle body so that the seat will not wiggle or move about or otherwise rattle or make noise due to looseness in the mounting.

The mounting for the seat presumes the use of an anchoring track in the floor of the vehicle body. Such a track usually has its top face flush with the surface of the floor, and the track has a recessed guideway along its length. The recessed guideway is partially enclosed by flanges protruding horizontally inwardly above the guideway, and the flanges have arcuately shaped recesses in their edges so as to define access openings to receive the feet and locking pins of the seat. The feet on the seat framework have enlarged heads which pass through the recessed portions of the flanges into the guideway and the feet also have narrow neck portions which may pass entirely along the length of the track between the flanges. The mounting has at least one pin which is urged downwardly against the bottom of the track at one of the recessed openings, so that the feet of the seat mounting are folded tightly up against the flanges of the track while the pin bears firmly against the bottom of the track. This pin prevents any endwise movement of the seat along the track and prevents any up and down movement or other wiggling of the mounting relative to the track.

In some instances, the pin is urged downwardly by a properly adjusted lever or linkage apparatus to create substantial pressure between the mounting and the track. In other instances, the pin is urged downwardly by a spring so as to continuously cause the pin to bear downwardly against the bottom of the track. This form with the spring is particularly useful in mountings for seat-related fixtures such as mountings for seatbelts, etc.

Another form of the spring pressed pin bearing downwardly into the bottom of the track is particularly useful in fixtures such as bumpers against which the wheels of a wheelchair may bear so that a wheelchair may be securely anchored in the vehicle.

DESCRIPTION OF DRAWINGS

FIG. 1 is a side elevation view of a passenger seat in a vehicle and showing the general relationship of the mounting to the floor of the vehicle.

FIG. 2 is an enlarged detail section view taken approximately at 2—2 in FIG. 1.

FIG. 3 is an enlarged detail section view taken approximately at 3—3 in FIG. 1.

FIG. 4 is a detail section view taken at 4—4 in FIG. 1.

FIG. 5 is a detail section view taken at 5—5 in FIG. 1.

FIG. 6 is an elevation view of the seat structure provided with a demountable fixture for securing a seatbelt.

FIG. 7 is an enlarged detail view of the seatbelt mounting.

FIG. 8 is a section view taken at 8—8 in FIG. 7.

FIG. 9 is a section view taken at 9—9 in FIG. 7.

FIG. 10 is a section view taken at 10—10 in FIG. 7.

FIG. 11 is a partial top plan view of the floor and track of a vehicle body.

FIG. 12 is an elevation view of a wheelchair securing assembly.

FIG. 13 is a detail section view taken at 13—13 of FIG. 11.

FIG. 14 is a detail section view taken at 14—14 of FIG. 13.

FIG. 15 is a detail section view taken at 15—15 of FIG. 13.

FIG. 16 is a section view similar to FIG. 15, but showing a shifted position.

FIG. 17 is a detail section view taken at 17—17 of FIG. 13.

DETAILED SPECIFICATION

A principal form of the invention is illustrated in FIGS. 1 - 5 for the purpose of detachably mounting a seating device indicated in general by numeral 10 to the floor 11 of a passenger bus. It is contemplated that under certain circumstances, the seating devices in the bus may be rearranged or removed in order to accommodate other types of equipment or material which is to be carried. In some instances, it may be desired to substitute other types of seating devices as for the purpose of retaining wheelchairs in fixed position in the bus during travel.

The seating device 10 has a substantially horizontal seat cushion 12 and an upright back 13, and a frame 14. The seating device is provided with a base means 15 which, in the form illustrated, comprises an elongate frame rail made out of channel iron 16 having a horizontal web or flange 16a and an upright web or flange 16b. The horizontal web or flange 16a lies at the level of the floor 11 and bears downwardly upon the upper surface 17 of an anchoring track 18 preferably made of steel and affixed to the floor structure 11 of the passenger bus as by bolts.

The anchoring track 18 has an elongate guideway 19 extending longitudinally therethrough at a location above the bottom 20 and between the two upright sides 21. The track 18 has a pair of elongate flanges 22 and 23 projecting inwardly and toward each other into spaced edge to edge relation with each other to enclose at least portions of the top of guideway 19. The flanges 22 and 23 define an elongate keyway 24 between the spaced edges thereof. Each of the flanges 22 and 23 has a plurality of recesses 22.1 and 23.1 spaced at regular intervals along the length of the flanges. The recesses 22.1 and 23.1 are directly opposite each other and each of these pairs of recesses cooperatively defines a circular access opening 25 into the guideway 19. It will be recognized that the access openings 25, defined by the cooperating opposite recesses, are substantially circular in shape, but could have other shapes if desired.

On the seating device 10, the base 15 carries a pair of depending feet 26.

Each of the feet 26 has an elongate shank or neck portion 27 suspended beneath the horizontal flange 16a of the frame rail 16, and an enlarged head 28 which is formed integrally of the narrow neck 27. The head 28 is confined in the guideway 19 of the anchoring track and the peripheral portions of the head confront adjacent areas of the flanges 22 and 23. The flanges prevent the head 28 of the foot from moving upwardly out of the track 18. The upper portion 27.1 of the shank or neck portion of the foot is threaded and has a clamping nut 29 thereon so as to hold the foot in affixed relation with respect to the frame rail 16. As illustrated, the frame rail has two such feet 26 thereon, each disposed adjacent a respective end of the frame rail. The feet 26 are spaced from each other by a distance equaling the center to center spacing between a pair of the access openings 25 in the track. Accordingly, the feet 26 may be shifted longitudinally in the guideway 19 of the track so as to be aligned with a pair of the openings 25 through which the feet may be extracted for removing the seating device from the floor of the passenger bus.

The mounting of the seating device 10 is also provided with an upright locking pin indicated in general by numeral 30 and engageable with the track 18 to prevent endwise movement of the frame rail 16 and seat 26 relative to the track 18. The locking pin 30 is guided for vertical sliding movement by a bearing sleeve or bushing 31 which is supported by an arm or ear 32 which is formed integrally of a base plate 33 affixed as by bolts 34 to an upright bracket 35 which is affixed as by welding to the frame rail 16.

The pin 30 is also guided for vertical sliding movement by an annular bushing 36 which is affixed as by welding to the horizontal web or flange of the frame rail 16 which also has an opening 16c therethrough so that the pin 30 may be moved by sliding upwardly and downwardly through the frame rail 16. The lower end of the pin 30 is provided with an adjustable tip 37 carried on a threaded stud 38 which is threaded into a threaded recess 39 in the lower end of the body portion of pin 30. The tip 37 of the pin may thereby be adjusted so as to lengthen or shorten the pin 30 as a whole. The tip 37 is retained in adjusted position as by a jam nut 40 also threaded on the stud 38.

It will be seen that the tip end of the locking pin 30 projects into one of the circular access openings 25 of track 18, and the tip fits snugly in the access opening so as to bear against the peripheries of the recesses in the flange and thereby prevent any movement of the pin 30 or frame rail 16 endwise along the anchoring track 18. The feet 26 are thereby maintained in confronting relation with the flanges 22 and 23 and are prevented from lifting out of the track.

The pin 30 is also provided with pressure means indicated in general by numeral 41 for applying downward pressure on the pin so as to cause the pin 30 to bear downwardly against the bottom 20 of the track 18 with the effect that the heads 28 of the feet are drawn upwardly tightly against the confronting flanges 22 and 23 so that the entire frame rail 16 is very tightly adhered to the anchoring track 18. The pressure means includes a linkage having two links 42 and 43 connected between the upper end of pin 31 and the stationary base plate 33. More specifically, the links 42 and 43 are interconnected with a pivot 44, and the link 43 is also swingably connected by a pivot 45 to the upper end of the slidable locking pin 30. The linkage also includes a second link identical to link 43 and parallel for symmetry and to provide a balanced arrangement on opposite sides of both the pin 30 and the link 42. The upper end of link 42 is connected by pivot 46 to a pair of spaced and parallel ears 47 which receive the link 42 therebetween and which are affixed or formed integrally of the base plate 33. Link 42 has an elongate handle 42.1 formed integrally thereof for the purpose of operating the linkage and manipulating the pin 30 in upward and downward directions.

The link 42 and handle 42.1 swing upwardly and downwardly in the direction of arrows A and move in a vertical plane which also includes the axis of the cylindrical pin 30 and it will be seen that the handle 42.1 substantially engages the upper end of the pin 30 when the handle is swung to its lowermost position.

In the lowermost position of the handle 42.1, the pivot 44 is swung to an over-center position relative to the positions of the other two pivots 45 and 46 so that the linkage resists any tendency on the part of pin 30 to move upwardly. Any upward pressure exerted by the pin 30 on the linkage tends to move the pivot 44 further to the righthand direction as illustrated in FIG. 2 and further to the over-center direction which immediately causes the handle 42.1 to engage the upper end of pin 30 and which prevents any further movement of the handle or link 42 in that direction. Accordingly, the linkage produces outward pressure on the pin 30 and maintains that pressure so that the lower end of the pin 30 at the tip 37 continues to apply downwardly against the bottom of the track 18. As previously described, this downward pressure by locking pin 30 on the track tends to cause the base plate 33 and bracket 35 to lift up on the frame rail 16 which also causes the feet 26 to draw the heads 28 thereof tightly upwardly against the flanges 22 and 23 of the track. This entirely stabilizes the seating device and prevents any wiggling thereof or unintended movement in any direction until the linkage 41 is manually manipulated for the purpose of releasing the locking pin for upward travel.

The seating device has depending frame structure 14 at both ends of it so that there are two frame rails 16 which support each of the seating devices. Each of the frame rails 16 is supported on a similar track 18 and has the supporting feet 26 locked to the track by the downward pressure exerted by the adjacent locking pin 30.

Upward swinging of the handle 42.1 causes the adjacent locking pin to be withdrawn from the anchoring track 18 so that the frame rail 16 and the feet 26 may be moved longitudinally of the track 18 to a slight extent so that the feet 26 may be withdrawn through the access openings 25.

In the form illustrated in FIGS. 6 – 10, the seating device 10 is accompanied by a second seating device 50 for the purpose of mounting a seat belt 51 and anchoring the seat belt to the floor 11 of the passenger bus. The seating device 50 incorporates a rigid steel loop 52 affixed to a base plate or frame rail 16.1. The frame rail 16 lies downwardly against the top of track 18 which is the same as illustrated in FIGS. 1 – 5 and has the guideway 19 and the flanges 22 and 23 which overlie the guide rail. The frame rail 16.1 has feet 26 mounted thereon and constructed identically to the feet 26 as previously described. The feet 26 have the heads 28 located in and slidable along the guideway 19 and with the reduced neck portion 27 ordinarily confined between the flanges 22 and 23, in the keyway 24 of the track.

In this form of the invention, the locking pin 30.1 is confined within a cylindrically shaped housing 53 affixed as by welding to the frame rail 16.1.

A pressure device or spring 41.1 bears downwardly on the pin 30.1 and is anchored against the closed end 53a of the housing 53 for the purpose of continuously applying pressure on the pin 30.1 and urging the pin downwardly against the bottom of rail 18. The pin 30 may be lifted from its downwardly extended position by a handle or pin 54 which protrudes outwardly to the side of housing 53 and through an L-shaped slot 55 therein.

The downward pressure against the pin 30.1 causes the pin to bear sufficiently tightly against the bottom of the track 18 as to cause the feet 26 to have their heads drawn tightly up against the flanges 22 and 23 of the track with the effect that the entire seating device 50 is rigidly and firmly maintained in stationary position on the track 18.

Another form of seating device 60 is illustrated in the form of the invention illustrated in FIGS. 11 – 17. This seating device 60 is to be anchored in the floor 11 of the passenger bus 11.1 for the purpose of bearing against the wheels W of a wheelchair WC which is to be anchored by the seating device 60 against any movement in the passenger bus as the bus travels down the highway. The seating device is releasably secured to a pair of mounting tracks 18 extending along each other as illustrated in FIG. 11 and identical to the track 18 hereinbefore illustrated.

The principal functional part of the seating device 60 is an elongate horizontal and rigid rail 61 against which the wheels W of the wheelchair WC will bear, and to which the frame of the wheelchair will be secured as by additional bracket structure 62 in a manner substantially described in copending application Ser. No. 772,457, filed Feb. 28, 1977.

The rigid rail 61 spans two adjacent tracks 18 and is releasably affixed to each of the tracks by a bracket or frame structure 62, the lowermost portion of which forms a frame rail 16.2 formed integrally of the frame 42.

In this form of the invention, the bottom frame rail 16.2 of the seating device 60 has feet 26 secured therein in the manner previously described and extending down into the guideway 19 of the track 18 as previously described.

The locking pin 30.2 is guided for vertical sliding movement by a bearing sleeve 36.2 which is affixed as by welding to the frame rail 16.2 and a slide bearing opening 16.2c in the frame rail 16.2 also guides the pin 30.2 in vertical movement. The pin 30 has an operating handle or ring 63 on its upper end for the purpose of extracting the lower end of the pin from the track 18.

A pressure device or compression spring 64 continuously bears downwardly against a retainer ring 65 affixed on the periphery of pin 30.2; and the upper end of the spring 64 continuously bears against a stationary sleeve 66 affixed as by welding to the frame 62.

A pin 67 traverses the pin 30.2 and to be seated in the notch 36.23 to allow the lower end of pin 30.2 to be entirely seated in the track 18. The pin 67 may be entirely extracted from the notch and turned to one side.

It will be seen that I have provided a new and improved apparatus for locking and securely holding the detachable mounting of a seating device in a passenger bus to the floor of the bus in such a manner that the seating device will be very firmly related to the floor of the bus and will not wiggle or otherwise inadvertently move around. The heads of the supporting feet are confined in the guideways in the floor mounted anchoring tracks and the heads of the supporting feet are continuously pulled firmly upwardly against the mounting flanges.

What is claimed is:

1. A detachable mounting for securing the frame of a seating device to the floor of a passenger bus, comprising an elongate anchoring track to be affixed on the floor of the bus, and a base means to be affixed to the seat frame and to overlie the track and having supporting feet and a locking pin thereon to engage the track, the anchoring track having a rigid bottom and a longitudinally extending open guideway and also having a pair of rigid retainer flanges overlying the guideway and arranged in spaced edge to edge relation to each other and defining an elongate keyway therebetween, the flanges having a plurality of pairs of recesses in the edges thereof at regularly spaced intervals along the track, each pair of recesses being located directly opposite each other and cooperatively defining an enlarged access opening into the guideway, the supporting feet having enlarged heads in the guideway and in confronting relation with the flanges and also having narrow necks extending through the keyway to the base means, the spacing between the feet equaling the center to center spacing between a pair of such access openings, and the heads being smaller than said openings to pass therethrough, the heads being slidable in the guideway to shift into alignment with openings for removal therethrough, and the locking pin being removably inserted into one of the access openings of the guideway to prevent sliding of the feet along the track and to maintain the heads in confronting relation with the track flanges, the pin engaging the bearing firmly against the bottom of the track, and pressure means on the base means and applying significant pressure on the locking pin and toward the track and thereby drawing the heads of the feet firmly against the track flanges.

2. The detachable mounting according to claim 1 and the access openings in the track and the locking pin having complementary shapes for tightly fitting therebetween.

3. The detachable mounting according to claim 1 and the pressure means comprising a swingable linkage connected to the pin and also connected to a bracket on the base means.

4. The detachable mounting according to claim 1 and the pressure means comprising a compression spring anchored against the base means and bearing downwardly on the locking pin.

5. The detachable mounting according to claim 3 and a bearing sleeve on the base means and guiding the locking pin toward and away from the anchoring track, the linkage having pivot points swingable to over-center position to lock the pin in downwardly extended position in the track.

6. The detachable mounting according to claim 1 wherein the base means has a seating cushion and back affixed thereon for passenger seating.

7. The detachable mounting according to claim 1 wherein the base means has anchoring means affixed thereto and retaining a seat belt thereon.

8. The detachable mounting according to claim 1 and said base means has a horizontal bumper rail spaced therebetween and affixed thereto for anchoring a wheelchair thereagainst.

9. The detachable mounting according to claim 1 and the locking pin being disposed between the supporting feet.

10. Seating apparatus to be supported upon the floor of a passenger bus, comprising
a seating device comprising a seating cushion, a back, and a frame, an elongate anchoring track to be affixed on the floor of the bus, a base means on the frame of the seating device to overlie the track and having supporting feet and a locking pin thereon,
the anchoring track having a rigid bottom and upright side and defining a longitudinally extending open guideway along the length of the track, the track also having a pair of rigid retainer flanges overlying the elongate guideway and arranged in spaced and edge to edge relation with each other and defining an elongate keyway therebetween, the flanges having a plurality of pairs of recesses in the edges thereof at regularly spaced intervals along the track, each pair of recesses being located directly opposite each other and cooperatively defining an enlarged access opening into the guideway,
the supporting feet having enlarged heads in the guideway and in confronting relation with the flanges to be held by the flanges against upward movement relative to the track, the supporting feet also having narrow necks extending through the keyway to the base means of the seating device, the spacing between the feet equaling the center to center spacing between a pair of such access openings, and the heads being smaller than said openings to pass therethrough, the heads being slidable in the guideway to shift into alignment with the openings for removal therethrough,
the locking pin being removably inserted into one of the access openings of the guideway to prevent sliding of the feet along the track and to maintain the heads of the feet in confronting relation with the track flanges, the pin engaging and bearing firmly against the bottom of the track, and the pin fitting snugly into the opening of the track to minimize any relative movement between the pin and the track, and pressure means on the base means and supplying significant downward pressure on the locking pin and toward the track, the pressure means including a swingable linkage pivotally attached to a bracket on the base means of the track, the articulated linkage simultaneously causing a downward pressure on the pin and upward pressure on the base means to thereby draw the heads of the feet firmly against the track flanges, the linkage swinging into locked, over-center relation to retain the pin in downwardly oriented position, and a guiding sleeve also affixed to the bracket of the base means and guiding the pin in transverse movement relative to the base means and track for sliding longitudinal movement into and out of the track openings.

* * * * *

UNITED STATES PATENT AND TRADEMARK OFFICE
CERTIFICATE OF CORRECTION

PATENT NO. : 4,114,947
DATED : September 19, 1978
INVENTOR(S) : Eldrid W. Nelson It is certified that error appears in the above-identified patent and that said Letters Patent are hereby corrected as shown below:

On Title page, after "Assignees:", delete "Chas. Olson & Sons; Wheel Service Co., Inc.," and substitute
--Chas. Olson & Sons and Wheel Service Co., Inc.,--

Signed and Sealed this

First Day of June 1982

[SEAL]

*Attest:*

GERALD J. MOSSINGHOFF

*Attesting Officer*     *Commissioner of Patents and Trademarks*